(12) United States Patent
Kohlschmidt et al.

(10) Patent No.: US 8,970,168 B2
(45) Date of Patent: Mar. 3, 2015

(54) CHARGING CIRCUIT FOR AN ENERGY STORE OF A PORTABLE ELECTRICAL DEVICE

(71) Applicant: Novero Dabendorf GmbH, Dabendorf (DE)

(72) Inventors: Peter Kohlschmidt, Weichering (DE); Frank Scholz, Berlin (DE); Peter Jung, Otterberg (DE); Guido Bruck, Voerde (DE)

(73) Assignee: Novero Dabendorf GmbH, Dabendorf (DE)

( * ) Notice: Subject to any disclaimer, the term of this patent is extended or adjusted under 35 U.S.C. 154(b) by 283 days.

(21) Appl. No.: 13/675,425

(22) Filed: Nov. 13, 2012

(65) Prior Publication Data

US 2013/0314035 A1 Nov. 28, 2013

(30) Foreign Application Priority Data

Nov. 22, 2011 (DE) .......................... 10 2011 086 849

(51) Int. Cl.
*H02J 7/00* (2006.01)
*H02J 7/02* (2006.01)
*H02J 5/00* (2006.01)

(52) U.S. Cl.
CPC ................. *H02J 7/025* (2013.01); *H02J 5/005* (2013.01); *H02J 7/0042* (2013.01)
USPC ....................................................... 320/108

(58) Field of Classification Search
CPC ........ H02J 7/025; H01F 38/14; Y02T 90/122; B60L 11/182; Y02E 60/12
USPC ....................................................... 320/108
See application file for complete search history.

(56) References Cited

U.S. PATENT DOCUMENTS

| | | | |
|---|---|---|---|
| 3,641,440 A * | 2/1972 | Bush | 455/150.1 |
| 4,572,964 A * | 2/1986 | Honig | 307/106 |
| 6,028,413 A | 2/2000 | Brockmann | |
| 7,519,328 B2 * | 4/2009 | Dokai et al. | 455/41.2 |
| 2004/0145342 A1 * | 7/2004 | Lyon | 320/108 |
| 2009/0096413 A1 | 4/2009 | Partovi et al. | |
| 2010/0210207 A1 * | 8/2010 | Goto et al. | 455/41.1 |
| 2011/0084652 A1 * | 4/2011 | Julstrom et al. | 320/108 |

(Continued)

FOREIGN PATENT DOCUMENTS

| | | |
|---|---|---|
| DE | 197 41 279 A1 | 3/1999 |
| DE | 10 2009 033 751 A1 | 4/2010 |
| JP | 2011-234566 A | 11/2011 |

*Primary Examiner* — Arun Williams
(74) *Attorney, Agent, or Firm* — James R. Crawford; Fulbright & Jaworski LLP (57) ABSTRACT

Charging circuit for energy store of a portable electrical device has a first resonance switching circuit with a first receiver coil for receiving an alternating magnetic field which induces an electric voltage in the first coil, and an electrical component connected to a terminal of the first coil. The first coil and the further electrical component determine a resonance frequency (f0) of the first resonance switching circuit, A second resonance circuitry is also provided and has a second receiver coil and a further electrical component which determine a resonance frequency (f1, fn) of the second resonance circuitry. The resonance frequency of the second resonance circuitry is an integer multiple of the resonance frequency of the first resonance switching circuit. Receiver coils of the resonance circuitry are disposed such that during operation they are permeated by the same magnetic field lines of the alternating magnetic field.

11 Claims, 7 Drawing Sheets

(56) References Cited

U.S. PATENT DOCUMENTS

| | | |
|---|---|---|
| 2011/0140671 A1 | 6/2011 | Kim et al. |
| 2012/0299388 A1* | 11/2012 | Gong .......................... 307/104 |
| 2013/0026850 A1* | 1/2013 | Throngnumchai et al. ... 307/104 |

* cited by examiner

CHARGING CIRCUIT FOR AN ENERGY STORE OF A PORTABLE ELECTRICAL DEVICE

This application claims priority from German Patent Application No. DE 10 2011 086 849.6 filed Nov. 22, 2011, hereby incorporated by reference in its entirety.

The invention relates to a charging circuit for an energy store of a portable electrical device. The invention further relates to a portable electrical device with such a charging circuit and a configuration for charging an energy store of a portable electrical device, a method for charging an energy store of a portable electrical device and a method for the production of a charging circuit for an energy store of a portable electrical device.

Portable electrical devices, for example mobile telephones, PDAs (Portable Digital Assistants) audio and video playback devices, cameras, loudspeakers wearable on the head and microphone units (so-called headsets), flashlights, toothbrushes and coffee cups with integrated heater, to mention only a few, include an energy store for supplying the electrical device with electric energy. The device could otherwise not be operated or only under permanent power feed from an external source. For charging the energy store, a cable connection to the energy store is traditionally established and a charging current flows through the cable. However, cordless charging systems are also known, in the operation of which an alternating magnetic field is generated by a primary-side transmitting circuit and the alternating magnetic field is received by a secondary-side receiving circuit of the electrical device and converted by it into an electric voltage.

US 2009/0096413 A1, for example, describes a primary-side charging appliance with an energy source and a switch which is switched at a corresponding frequency in order to generate across a secondary-side winding an alternating voltage that generates an alternating magnetic field. The associated receiver comprises a secondary-side winding in which a voltage is generated that is rectified and smoothed by a capacitance in order to supply a load with power.

DE 10 2009 033 751 A1 describes a configuration for the wireless coupling of an electronic device with radio connection to automobile equipment. After the electronic device is placed onto a contact surface, it is coupled via a radio connection. The configuration further comprises a primary-side antenna for generating electromagnetic waves which is received by a secondary-side antenna of the electronic device and utilized for charging an energy store of the electronic device.

When, as described in US 2009/0096413 A1, a switch of the primary-side transmitting circuit is switched on and off with a suitable frequency, an alternating magnetic field is generated which, as a function of the inductance of the primary-side coil or antenna, follows more or less the rectangular switching trace of the switch in time. To transfer the energy or power as efficiently as possible to the secondary side, e.g. to the electrical device, the frequency of the alternating magnetic field is to be equal to a resonance frequency of the secondary-side receiver circuit. However, considerations and trials of the inventors have found that even When the primary-side switch is switched on and off with the resonance frequency of the secondary-side receiver circuit, a considerable portion of the energy of the alternating magnetic field is not converted into electric energy by the receiver circuit.

The present invention addresses the problem of improving the efficiency of the energy transfer by means of induction due to an alternating magnetic field. In particular, to be specified are a corresponding charging circuit, a portable electrical device, a configuration for charging an energy store of a portable electrical device and a method for the production of a charging circuit for an energy store, with which an efficient transfer of energy by means of an alternating magnetic field is enabled.

The invention builds on the finding that the primary-side transmitting circuit, similar to that described in US 2009/0096413 A1, can be operated in simple manner by switching the switch on and off at constant switching frequency. By constant switching frequency is to be understood that the switching frequency is constant or nearly constant over relatively longer operating phases. However, this does not preclude that, especially at the start of the transmission operation, an adaptation of the switching frequency to the resonance frequency of the secondary side be conducted. Yet such an operation with constant switching frequency is considerably less complex than is the operation with variable turn-on times in order to attain an approximately sinusoidal trace of the magnetic field strength of the alternating field. In contrast, the invention proposes utilizing the energy attributed to at least one harmonic of the alternating magnetic field on the receiving side (secondary side) also and to convert it into electric energy.

It is therefore proposed to provide on the receiving side, i.e. on the side of the electrical device, at least two receiver coils and to utilize them for the conversion of the magnetic field energy into electric energy. Each of the receiver coils forms with at least one further electrical component a resonance circuitry, wherein the resonance frequency of a first of the resonance circuitry is tuned, in particular, to the switching frequency of the primary-side transmitting circuit (or conversely the switching frequency of the transmitting side is tuned to the resonance frequency of the first resonance switching circuit) and wherein the resonance frequency of the second resonance circuitry is an integer multiple of the resonance frequency of the first resonance circuitry. In the case of a, for example, nearly rectangular trace of the magnetic field strength with constant alternating frequency, the resonance frequency of the second resonance circuitry is preferably the threefold of the resonance frequency of the first resonance circuitry. If, in this case, additionally a third resonance circuitry is utilized on the receiving side, its resonance frequency is preferably the fivefold of the resonance frequency of the first resonance circuitry. This is based on the finding that with said rectangular trace of the magnetic field strength the magnetic field energy is to be attributed to, on the one hand, the fundamental wave (i.e. to the frequency of the rectangular field strength trace) and, on the other hand, exclusively to the odd integer multiples of the fundamental frequency, i.e. to the odd harmonics.

Proposed is in particular: A charging circuit for an energy store of a portable electrical device, comprising a first resonance circuitry, with a first receiver coil for receiving an alternating magnetic field inducing an electric voltage in the first receiver coil, and at least one further electrical component connected to at least one terminal of the first receiver coil, wherein the first receiver coil and the at least one further electrical component with their impedances determine a resonance frequency of the first resonance circuitry.

At least one second resonance circuitry is provided, with a second receiver coil for receiving an alternating magnetic field inducing in the second receiver coil an electric voltage, and at least one further electrical component connected to at least one terminal of the second receiver coil, wherein the second receiver coil and the at least one further electrical component determine with their impedances a resonance frequency of the second resonance circuitry, wherein the resonance frequency of the second resonance circuitry is an integer multiple of the resonance frequency of the first resonance circuitry, and wherein the receiver coils of the resonance circuitry are disposed such that during the operation of the charging circuit these are permeated by the same magnetic field lines of the alternating magnetic field.

A corresponding method for charging an energy store of a portable electrical device comprises the following:
  receiving an alternating magnetic field and inducing an electric voltage through a first receiver coil, wherein a resonance frequency is determined during the induction of the electric voltage through the impedances of the first receiver coil and at least of a further electrical component, which together form a first resonance circuitry,
  receiving the same alternating magnetic field and inducing an electric voltage through a second receiver coil, wherein a resonance frequency is determined during the induction of the electric voltage through the impedances of the second receiver coil and at least of a further electrical component, which together form a second resonance circuitry,
  wherein the resonance frequency of the second resonance circuitry is determined to an integer multiple of the resonance frequency of the first resonance circuitry, and wherein the receiver coils of the resonance circuitry are disposed such that during operation of the charging circuit they are permeated by the same magnetic field lines of the alternating magnetic field.

A corresponding method for the production of a charging circuit for an energy store of a portable electrical device comprises the following steps:
  forming a first resonance circuitry with a first receiver coil for receiving an alternating magnetic field which in the first receiver coil induces an electric voltage, and with at least one further electrical component which is connected to at least one terminal of the first receiver coil, wherein through the determination of the impedances of the first receiver coil and of the at least one further electrical component a resonance frequency of the first resonance circuitry is determined,
  forming a second resonance circuitry, with a second receiver coil for receiving an alternating magnetic field which in the second receiver coil induces an electric voltage, and with at least one further electrical component which is connected to at least one terminal of the second receiver coil, wherein through the determination of the impedances of the second receiver coil and of the at least one further electrical component a resonance frequency of the second resonance circuitry is determined,
  wherein the resonance frequency of the second resonance circuitry is determined to an integer multiple of the resonance frequency of the first resonance circuitry, and wherein the receiver coils of the resonance circuitry are disposed such that during operation of the charging circuit they are permeated by the same magnetic field lines of the alternating magnetic field.

In particular, the at least two receiver coils are disposed such that they are not only permeated by the same magnetic field lines of the electric field but also with the same flux density of the magnetic flux. In particular, at least two of the receiver coils can therefore each comprise a winding of an electric line, wherein the electric lines of the at least two receiver coils extend parallel to one another and are supported by a common carrier. The electric lines of the at least two receiver coils preferably extend not only parallel to one another but rather also in contact on one another. The common carrier is, for example, a common housing and/or a common circuit board such as is generally known for supporting electric circuitry.

Also for the purpose of receiving in the several receiver coils the same magnetic field lines at the same flux density, in a practical arrangement it is proposed that at least two of the receiver coils comprise each at least one winding of an electric line, wherein the electric line of at least one of the receiver coils over the entire course of the turns of their winding runs parallel to the electric line of the other receiver coil or at least of one of the other receiver coils. Herein also the parallel extending electric lines are preferably in contact on one another (i.e. there is no interspace between the parallel extending lines). It is understood that it generally applies that lines in contact with one another or parallel lines disposed close to one another are electrically insulated with respect to one another (for example lacquered copper wire or copper strands or through additional insulating material between the lines).

In a special arrangement the electric lines of at least two of the receiver coils can form a common spiral-shaped winding, wherein the electric lines run next to one another in one winding plane of the spiral-shaped winding. Such an arrangement is especially flat with respect to the direction perpendicular to the winding plane.

In a further development, free of interfering effects due to line sections extending transversely to the spiral-shaped line sections, the electric lines form two spiral-shaped windings, wherein the sections of the electric lines extending in the interior of the two spiral-shaped lines are connected with one another such that a series circuit of the two viral-shaped windings at the outer sides of the spiral-shaped windings are electrically connected to further elements of the particular resonance circuitry. The two spiral-shaped windings are, in particular, disposed coaxially with respect to an axis through the center of the spirals. The two spiral-shaped windings are preferably directly superjacent to one another, wherein there is preferably no interspace between the two windings. The windings can alternatively be, for example, in contact on the opposing surfaces of a plate-shaped carrier (for example of a circuit board).

Similar to the manner already known per se for a single resonance switching circuit, to each of the resonance switching circuits, for example, a rectifier is connected. These several rectifiers can be connected in series and/or parallel to one another, depending on the desired charging current during operation of the charging circuit. In comparison to the solutions known in prior art with solely one receiver coil, therefore either the charging current or the charging voltage on the secondary side can be increased. It is understood that when using more than two resonance switching circuits the charging current as well as also the charging voltage can be increased. In this case rectifiers are connected parallel as well as also in series.

Further developments and arrangements of the method for charging an energy store of a portable electrical device and of the method for the production of a charging circuit for an energy store of a portable electrical device have already been, to some extent, stated explicitly or follow from corresponding arrangements of the charging circuit.

At least the receiver coils of the charging circuit can be integrated into an outer housing wall, for example into a housing cover of the portable electrical device, in particular such that the windings of the receiver coils extend along the surface of the housing. Alternatively, at least one of the receiver coils can be disposed such that it is on the inner surface of the outer wall in contact on the inside of the housing wall. According to an alternative or additional arrangement, at least one of the receiver coils is secured on the energy store which, for example in the case of mobile telephones or PDAs, is frequently cuboidal. The further electrical structural elements of the charging circuit are also preferably secured on the housing cover of the device and/or on or in the energy store.

The several receiver coils can, in particular, be combined with one or more flux conduction components for conducting the magnetic flux of the alternating magnetic field. A conventional material for flux conduction is ferrite. However, in principle other materials can also be utilized such as, for example, the earlier conventionally used iron, For example, the windings of several of the receiver coils turn about a common flux conduction component. This ensures that the several receiver coils are permeated by the same field lines of the alternating magnetic field. A flux conduction component further to a high degree ensures homogeneity of the magnetic field strength.

Within the scope of the invention is further a portable electrical device, wherein the device includes the charging circuit according to one of the arrangements and further an energy store, wherein the energy store is electrically connected to the charging circuit such that upon reception of an alternating magnetic field by the receiver coils, the electric voltage induced in the receiver coils generates a charging current which charges the energy store.

Within the scope of the invention is furthermore a configuration for charging an energy store of a portable electrical device which comprises the charging circuit or the portable electrical device in one of the described arrangements and further comprises a generation circuit for generating the alternating magnetic field. This generation circuit is the primary-side transmitting circuit.

With reference to the attached drawing, embodiment examples will he described. The individual Figures of the drawing depict:

FIG. 1 a section of a mobile telephone, wherein the top housing cover, under which is located a chargeable energy store, has an upwardly projecting truncated cone-shaped projection, FIG. 2 the mobile telephone according to FIG. 1, wherein the side with the projection is directed downwardly and the projection projects into a correspondingly formed truncated cone-shaped recess of a configuration for coupling the mobile telephone to equipment of a motor vehicle, wherein the mobile telephone is placed onto a contact surface of the configuration, FIG. 3 a top view onto the configuration according to FIG. 2 which shows the mobile telephone oriented in a specific rotational position relative to the rotational axis of the truncated cone-shaped recess on the contact surface, FIG. 4 schematically a configuration with a primary-side transmitting circuit for the generation of the alternating magnetic field and with a secondary-side receiving and charging circuit for charging an energy store, FIG. 5 circuit configurations of the transmitting side and the receiving side of a configuration for the wireless charging of an energy store, FIG. 6 a circuit configuration similar to that in FIG. 5, wherein however on the secondary side (receiving side) the rectifiers are connected in series instead of parallel to one another, FIG. 7 an enlarged depiction of the circuit configuration, already depicted in FIG. 5 and FIG. 6, on the primary-side (transmitting side), FIG. 8 an alternative circuit configuration of the transmitting side, which, for example, can be applied, instead of the circuit configuration depicted in FIG. 7, in the configurations depicted in FIG. 5 and FIG. 6, FIG. 9 a configuration with three receiver coils stacked one above the other, FIG. 10 a coil configuration with three receiver coils whose windings are wound to form a single common spiral winding, FIG. 11 a rectangular trace of constant frequency of the voltage on a primary-side transmitter coil for the generation of an alternating magnetic field, and FIG. 12 as a bar diagram, the energy components of a rectangular alternating magnetic weld corresponding to the voltage trace in FIG. 11 under the assumption that the inductance of the transmitter coil does not effect a significant smoothing of the rectangular trace, wherein the energy components are attributed to the fundamental wave and the harmonics of the fundamental wave.

Figure 1:
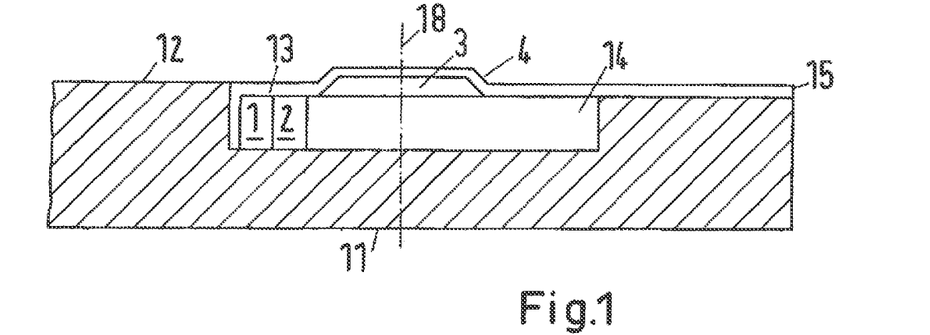
Figure 2:
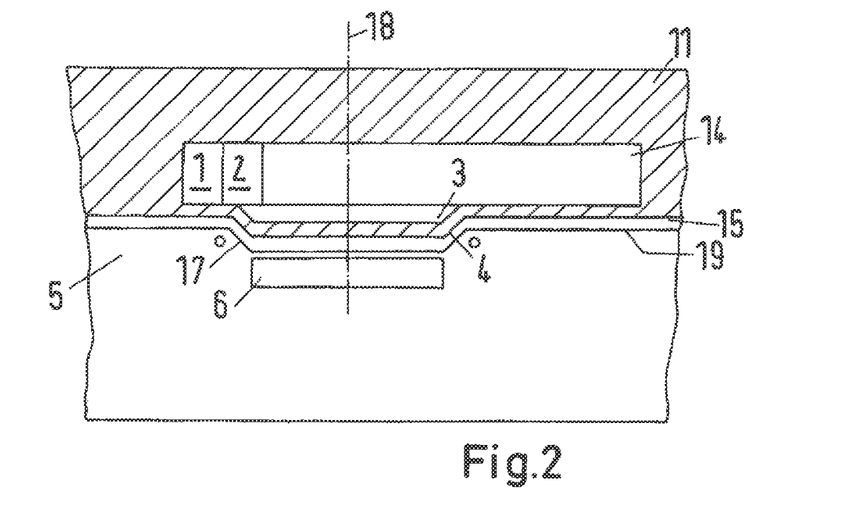
Figure 3:
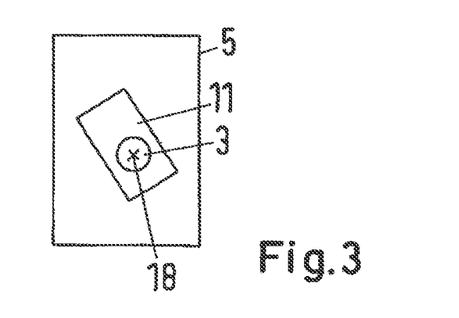

In FIGS. 1 to 3 a specific embodiment example of a mobile electrical device and a configuration for charging an energy store of the device is described. Even if a mobile telephone (and alternatively also another communication device that cannot communicate across a cellular mobile radio network but only, for example, via WLAN or Bluetooth connections) is a preferred application case for the present invention, the protection is thereby not restricted to mobile telephones or to the specific mechanical arrangements of the configuration in FIG. 1 to FIG. 3. Individual features of the example can also be omitted in other embodiments (for example the truncated cone-shaped projection) and/or the embodiment form can comprise additional features. A mobile telephone can therefore, for example, rest without projection on its support base and/or be held in an optimal position and/or orientations relative to the primary-side transmitting circuit by holding means acting under form and/or force closure.

The vertical section through a portion of a mobile telephone 11, shown in FIG. 1, shows a housing 12 which comprises a compartment 13 for receiving an energy store 14. The energy store 14 is, for example, a lithium ion accumulator or another electrochemical energy store.

The compartment 13 is closed with a cover 15. The cover 15 comprises a projection 4 in the shape of a truncated cone, which tapers upwardly and which includes on the inside a correspondingly formed truncated cone-shaped hollow volume below. In this hollow volume is preferably located the secondary-side configuration 3 of receiver coils, for example coils of a number of copper wire windings or stranded cable windings. The secondary-side configuration 3 is secured on a sample of the energy store 14 modified for the invention. Therefore a conventional energy store, which, as a rule, is cuboidal, can be exchanged against such an energy store 14 wherein optionally, in addition, also the conventionally flat battery compartment cover is exchanged for the cover 15 depicted in FIG. 1.

The energy store 14 comprises, in addition, the conventional electrical contacts 1 for applying the electrical contacting of corresponding contacts of the mobile telephone. Into the block of the energy store 14 furthermore is integrated an electric charging circuit 2 which enables charging the electric energy generated by the secondary-side receiver coils configuration 3, due to the received electromagnetic waves through induction, into the energy store proper, for example the electrochemical energy store. The charging circuit comprises in particular the further electrical components of the resonance circuitry and the rectifiers.

FIG. 2 depicts also a vertical section, wherein, however, the portion depicted in FIG. 1 of the mobile telephone 11 is oriented differently. The rotational axes of the truncated cone-shaped projection 4 of the cover 15 and the secondary-side antenna. 3 are oriented downwardly. They project into a corresponding truncated cone-shaped recess 17 of a configuration 5 for coupling the mobile telephone to equipment of the motor vehicle. Additional means, in order to couple, in particular, the radio antenna of the mobile telephone 11 to equipment (for example hands-free appliances, outside antenna of the motor vehicle), are not depicted in the Figures.

FIG. 2 shows also beneath the recess 17 a primary-side antenna 6 or transmitter coils for the generation of the electromagnetic waves, and therewith of the alternating magnetic field, which are received by the secondary-side antenna 3. The primary-side antenna 6 is preferably realized by a multiplicity of windings of an electric conductor, wherein the rotational axis of the windings coincides with the rotational axis of the truncated cone-shaped recess 17.

In the top view of FIG. 3 the mobile telephone 11 is depicted in an arbitrary rotational position about the rotational axis 18 of the secondary-side antenna 3, The primary-side antenna 3 is herein located in the position depicted in FIG. 2 within the recess 17. Although the secondary-side antenna 3 would not be visible in top view, it is depicted in FIG. 3 in order to explain the embodiment example of the invention. The mobile telephone 11 could assume any other rotational position about the rotational axis 18, wherein, however, the secondary-side antenna 3 is in any case positioned within the recess 17 or directly above the recess 17 and therein the rotational. axes of the projection 4 of cover 15 and of recess 17 coincide.

Figure 4:
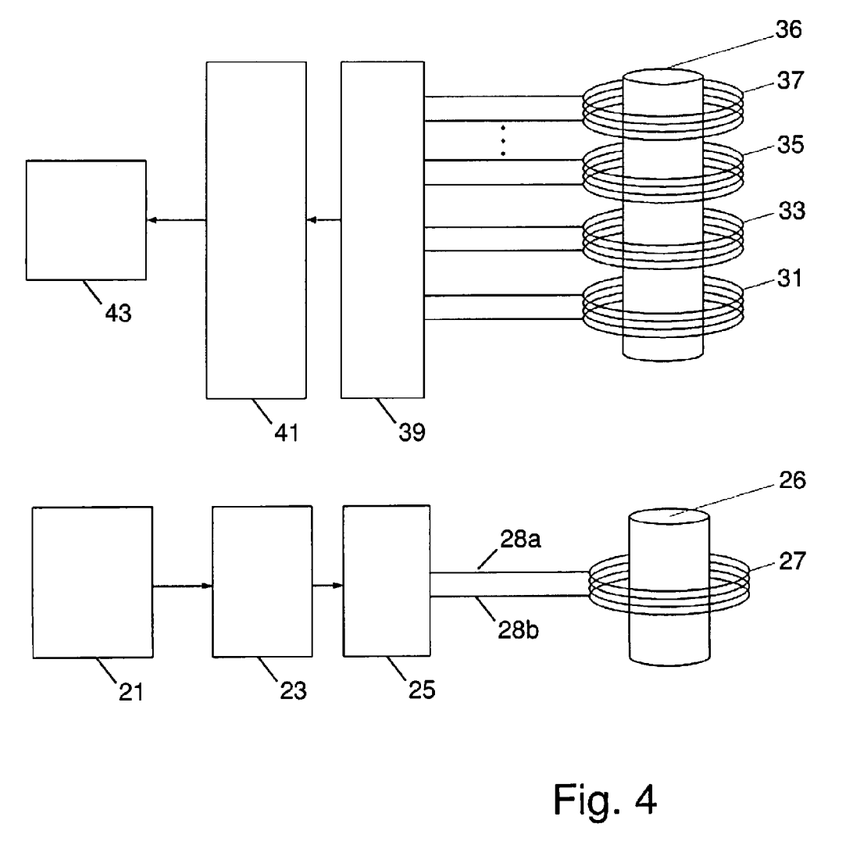
Figure 11:
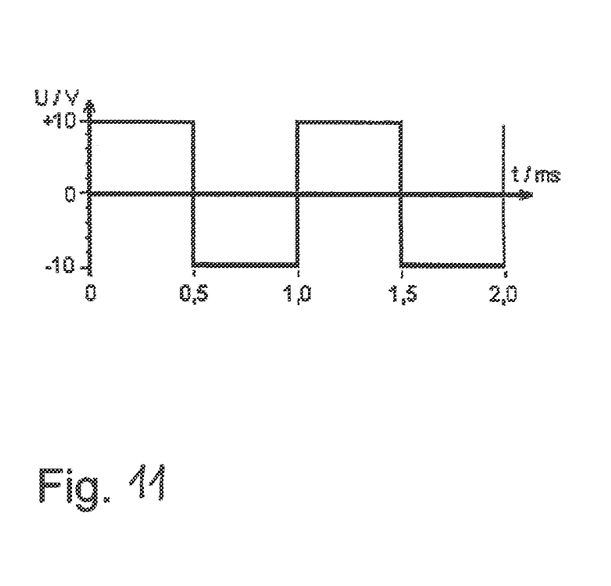

FIG. 4 shows in the lower portion a transmitting configuration with an energy supply means 21, a control 23, a circuit configuration 25 and a transmitter coil 27, electrically connected with the circuit configuration 25, wherein the transmitter coil 27 in the embodiment example depicted here is wound about a flux conduction component 26. During operation of the transmitting-side configuration, energy from the energy supply means 21 is supplied under control of control 23 to the transmitter coil 27, wherein the control. 23 controls switching ON and OFF of a switch (for example a semiconductor switch such as IGBT) such that, for example, the time trace depicted in FIG. 11 of the electric voltage U is connected to the electric terminals 28a, 28b of the transmitter coil 27, and therefore a substantially rectangular trace of the magnetic field strength of an alternating magnetic field is generated. Generally, and not only restricted to the embodiment example described here, at the electric terminals of the transmitter coil is preferably generated a rectangular voltage trace with a frequency of a few 10 kHz to some 100 kHz, for example in the frequency range of 50 kHz to 150 kHz.

The alternating magnetic field is received by a multiplicity of receiver coils 31, 33, 35, 37, which generate through induction a corresponding alternating voltage. The receiver coils 31, 33, 35, 37 are connected to a combination circuit 39 for the combination of several induced alternating voltages, which, in turn, is connected at the output end to a power receiver 41 (for example to a cable for conducting the resulting total charging current and/or to a charging current control). The power receiver 41, in turn, is connected to a load 43, for example the energy store of a mobile device.

During operation of the receiving configuration, the receiver coils 31, 33, 35, 37, due to the common flux conduction component 36 extending through the interior regions of the receiver coils 31, 33, 35, 37, receive the magnetic field lines of a homogeneous region of the alternating magnetic field. However, the combination circuit 39 comprises for each receiver coil 31, 33, 35, 37 individually adapted electrical components such that resonance circuitry with different resonance frequencies is formed. Contained herein is preferably at least the fundamental frequency of the rectangular alternating magnetic field and also preferably at least the frequency of the second harmonic (e.g. the threefold fundamental frequency) in the multiplicity of the realized resonance frequencies.

As indicated by the three points in the upper right area of FIG. 4, the configuration is also to be understood schematically with respect to the number of provided receiver coils and the resonance circuitry realized thereby. According to the invention at least two receiver coils are provided. In the case of four receiver coils, those resonance frequencies are preferably realized that correspond to the fundamental frequency, the second, the fourth and the sixth harmonic.

Figure 12:
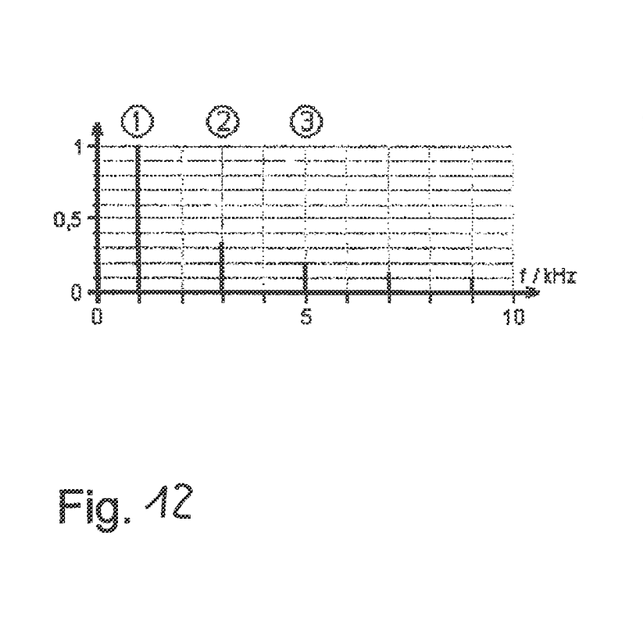

Relative to the energy content of the fundamental wave of the rectangular alternating magnetic field, FIG. 12 shows the energy content of the second, fourth, sixth and eighth harmonic. Without restricting the invention thereto, the frequency of the fundamental wave is for example 1 kHz. However, in practice the frequency of the fundamental wave is preferably of the order of magnitude of 100 kHz. In the example of FIG. 12 the frequency of the second harmonic is consequently 3 kHz, the frequency of the fourth harmonic 5 kHz, the frequency of the sixth harmonic 7 kHz and the frequency of the eighth harmonic 9 kHz. The energy components of the harmonics are lower than the energy content of the fundamental wave and are, for example in the case of the second harmonic, approximately 33% of the energy content of the fundamental wave. The energy contents of the higher harmonics decrease further with increasing frequency. As depicted by the numbers 1, 2, 3 each in a circle, in a corresponding receiving-charging circuit, for example for each of the fundamental wave, the second harmonic and the fourth harmonic a resonance switching circuit as receiving circuit is realized which has the corresponding frequency as the resonance frequency.

Figure 5:
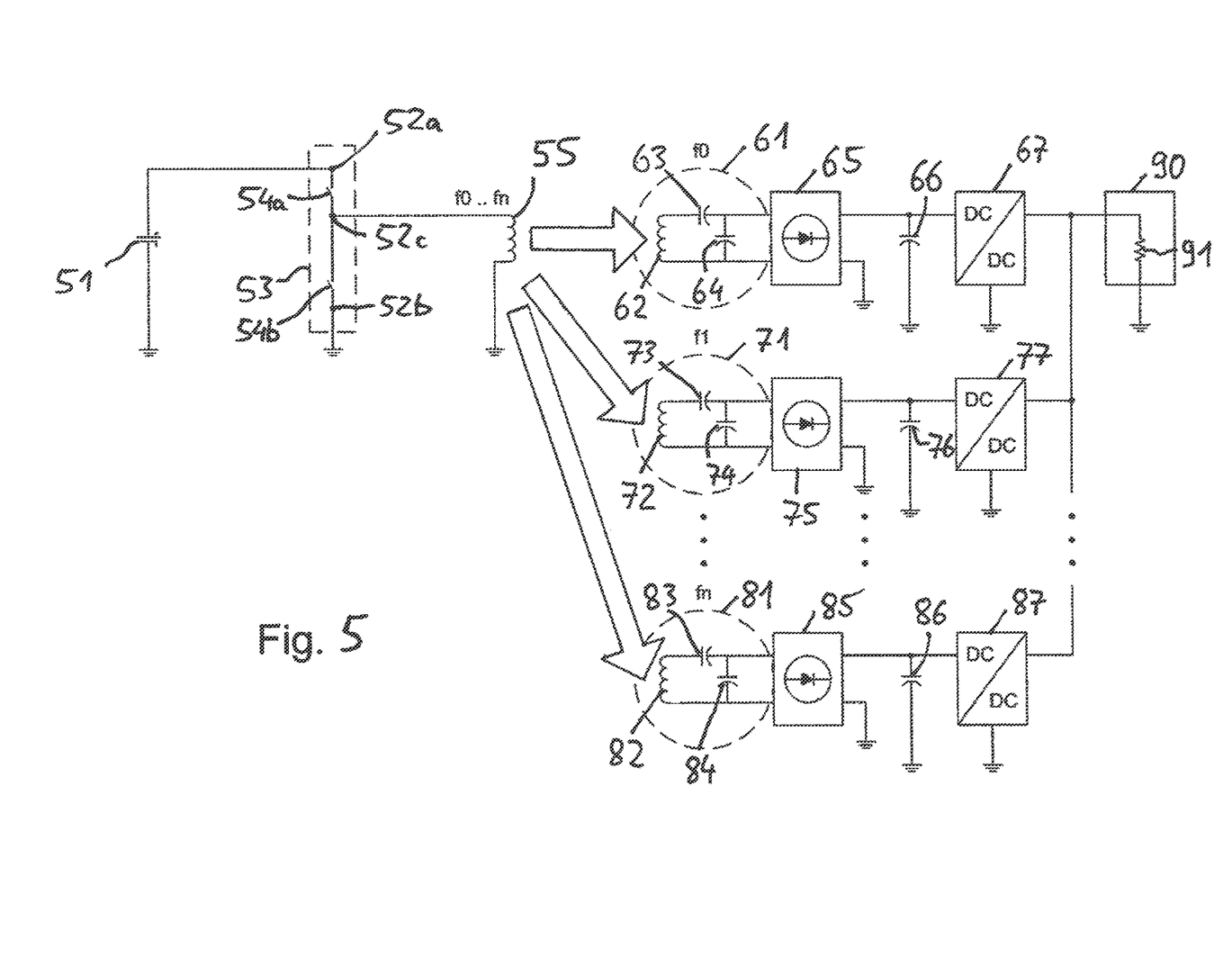

The transmitting circuit configuration shown in the left portion of FIG. 5 comprises a voltage source 51, whose one potential is, for example, at ground potential. The other potential of the voltage source 51 is connected to a first terminal 52a of a switch bridge 53 comprising two series-connected switches 54a, 54b, The opposite terminal 52b of the switch bridge 53, in turn, is for example at ground potential. A further terminal 52c of the switch bridge 53 located between switches 54a, 54b is connected to a first terminal of the transmitter coil 55. The other terminal of the transmitter coil 55 is, for example, again at ground potential. Instead of ground potential, one connection each to another reference potential can be established. Modifications of the transmitting circuit can further be carried out, such as for example will yet be explained with reference to FIG. 8. The switches 54a, 54b are controllable switches, e.g. when initiated by the control (not shown in FIG. 5) the switches 54a, 54b are switched ON and OFF.

Figure 7:
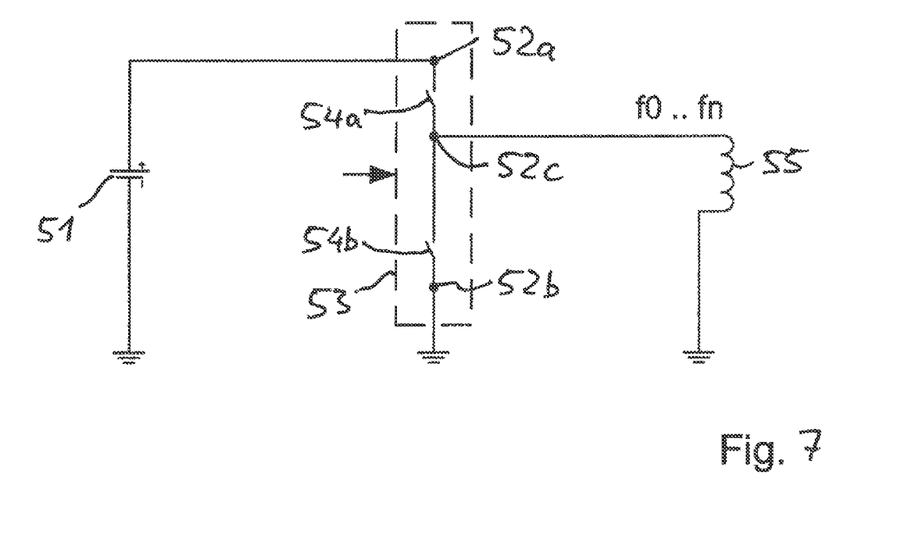

The transmitting circuit configuration according to FIG. 5, which is also depicted at an enlarged scale in FIG. 7, is operated in the manner of an alternating current converter or inverted rectifier, i.e. the switches 54a, 54b are simultaneously neither in the switched-on nor the switched-off state, apart from short, negligibly small time periods which occur during the switching-over of switches 54.

Consequently, one of the switches 54 is switched on at any given time and one of the switches 54 is switched off. If, for example, the upper switch 54a is switched on, the positive (in FIG. 5 the upper) potential of voltage source 51 is connected to the upper terminal of the transmitter coil 55. In contrast, if the lower switch 54b is switched on, the reference potential is connected to the above depicted terminal of the transmitter coil 55.

The receiving-side charging circuit in FIG. 5 comprises a multiplicity of resonance switching circuitry 61, 71, 81, and a series of dots indicates that the number of resonance switching circuits and equipment connected thereto can vary in the several feasible arrangements. In the embodiment example each of the resonance switching circuits 61, 71, 81 comprises a receiver coil 62, 72, 82, parallel to which is connected a first capacitor 64, 74, 84. Furthermore, between each terminal of the receiver coil 62, 72, 82 and a terminal of the parallel-connected first capacitor 64, 74, 84 a second capacitor 63, 73, 83 is provided. The impedances of the receiver coil 62, 72, 82 and the capacitors 63, 64; 73, 74; 83, 84 are selected such that each of the resonance switching circuits 61, 71, 81 has a pre-set resonance frequency f0, f1, fn. In FIG. 5 above the transmitter coil 55 is indicated by "f0 . . . fn" that the alternating magnetic field generated by the transmitter coil 55 includes fundamental wave and harmonics corresponding to these frequencies. It is understood that on the receiving side there is no need for a resonance switching circuit to be provided for each of these frequencies of the harmonics, which has the corresponding resonance frequency. Each of the capacitances can be realized, for example, through one or several condensers.

On the receiving side one rectifier 65, 75. 85 each is connected to the resonance circuitry 61, 71, 81 with their alternating voltage side and specifically in double-pole connection to the opposite terminals of the first capacitor 64, 74, 84. The direct voltage side of the rectifier 65, 75, 85 is each connected with one pole to ground or reference potential and with the other pole to a DC/DC converter (e.g. to a direct voltage converter). For smoothing the DC voltage at the output side of rectifier 65, 75, 85, the terminal connection between the rectifier and the DC/DC converter 67, 77, 87 is connected to reference potential, or ground across a third capacitor 66, 76, 86.

The DC/DC, converters convert the particular DC voltage at their input side, which is generated by the rectifier 65, 75, 85, into a pre-set DC voltage wherein the pre-set DC voltage at the output sides of all DC/DC converters 67, 77, 87 is of equal magnitude. The load current driven by the pre-set DC voltage at the output side of the DC/DC converters is subsequently comprised of the sum of the DC currents due to the induction in the several resonance switching circuits 61, 71, 81. Stated differently, each of the DC/DC converters provides at its output side an electric power corresponding to the received power and converted in the particular resonance switching circuit 61, 71, 81 minus the rectification and conversion losses of the rectifiers and the DC/DC converters. If the term 'pre-set DC voltage' at the particular output side of the DC/DC converters is used, this does also include the case in which the pre-set DC voltage can vary over time. It is, for example, feasible that an energy store charging control controls the DC/DC converters with respect to the output-side DC voltage.

At the upper right in FIG. 5 is depicted equipment 90 comprising a load 91 which is supplied with electric current by the circuit configuration. The load 91 can in particular be an energy store, for example an electrochemical energy store for the supply of an electrical device. However, the load 91 can also be the combination of the electrical device with the energy store, e.g. the electrical device can obtain its current during the operation at least to some extent directly from the circuit configuration with the resonance circuitry 61, 71, 81.

Figure 6:
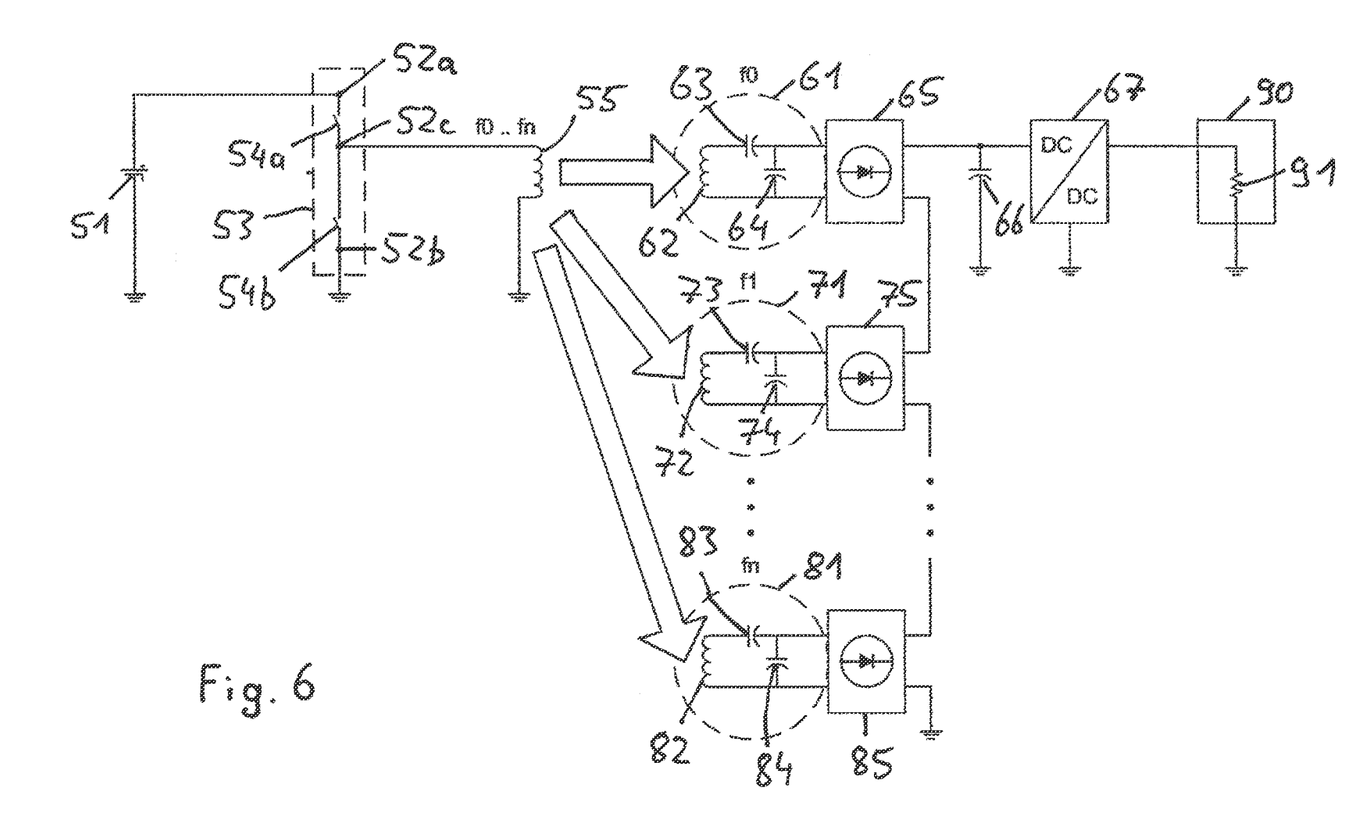

FIG. 6 shows a receiving-side circuit configuration modified in comparison to FIG. 5, identical elements and equipment in FIG. 5 and FIG. 6 are denoted by the same reference numbers. In the following only the differences between receiving-side circuit configurations in FIG. 5 and FIG. 6 will be discussed.

The rectifiers 65, 75, 85 according to FIG. 6 are not connected parallel but rather in series. This means that only one of the rectifiers, namely rectifier 85, is connected with one pole to the reference potential. The voltages at the DC voltage sides of the rectifiers 65, 75, 85 therefore are added during the operation.

Consequently only a single rectifier, namely rectifier 65, is connected with one pole to a DC/DC converter 67, wherein the terminal connection for smoothing the DC voltage, in turn, is connected across a third capacitor 66 to reference potential. As in the case of FIG. 5, the output side of the DC/DC converter is connected to the equipment 90 and therewith to load 91.

Figure 8:
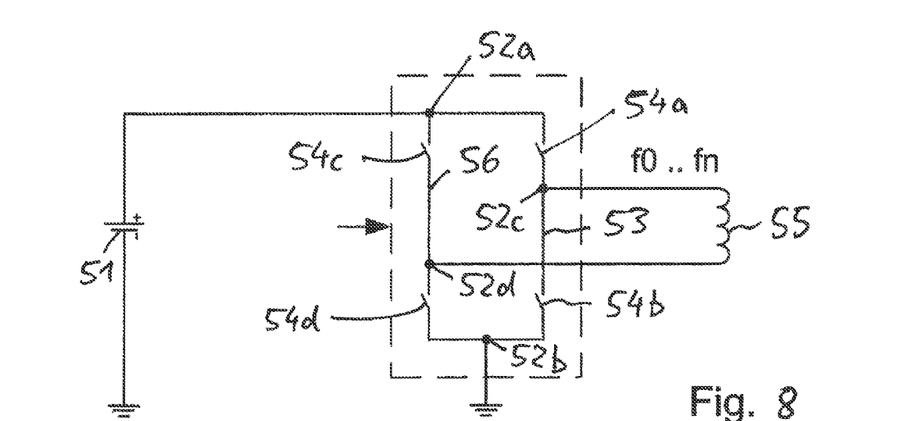

FIG. 7 shows at an enlarged scale the circuit configuration on the transmitting side of the configurations in FIG. 5 and FIG. 6. FIG. 8 represents an alternative. Again, identical elements and equipment are denoted by the same reference numbers. In the following the differences from the configuration in FIG. 7 will be discussed.

Between the terminals 52a, 52b a second switch bridge 56 is connected parallel to the switch bridge 53, which bridge 56 comprises also two series-connected controllable switches 54c, 54d. A terminal 52d between the two switches 54c, 54d is connected to the second terminal of the transmitter coil 55 which, in the configuration in FIG. 7, is connected to reference potential. In a manner known per se of a full-bridge inverted rectifier through the corresponding control of the switching points in time of the switches 54 to the transmitter coil 55 is alternatingly applied the full voltage of the DC voltage source 51 (when switches 54a and 54d are closed, e.g. are switched on, and switches 54c, 54d opened, e.g. are switched off) and the full inverted voltage of the DC voltage source 51 (when switches 54c, 54b are closed and the switches 54a, 54d are opened). The voltage amplitude of the AC voltage which is applied to the transmitter coil 55 is consequently twice as high as in the case of FIG. 7.

Figure 9:
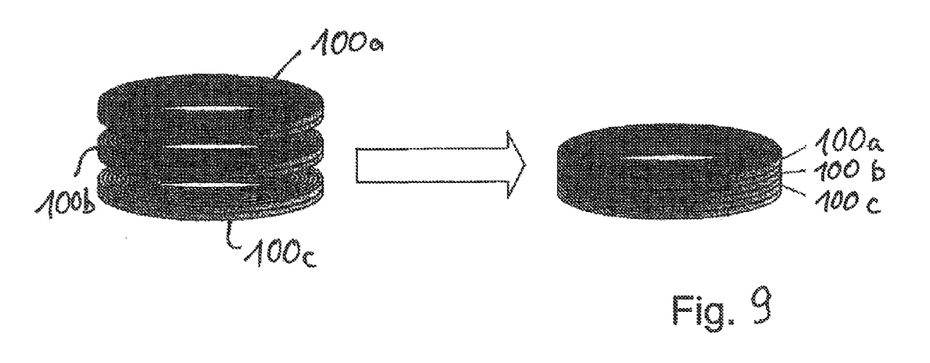

The coil configuration depicted in FIG. 9 comprises three receiver coils 100a, 100b, 100c stacked one above the other. The left portion of the Figure shows that the receiver coils 100a, 100b, 100c are separate coils electrically isolated from one another. The three coils can, for example, be each a part of a resonance switching circuit as described in conjunction with FIG. 5 and FIG. 6.

Figure 10:
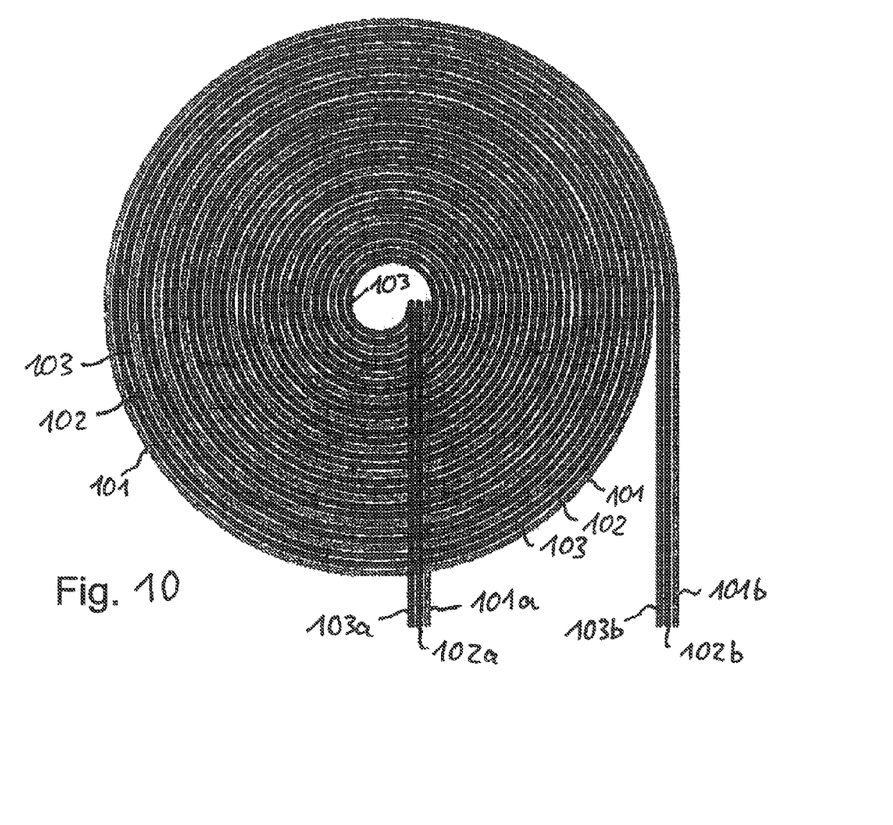

Another feasibility of implementing a configuration of three receiver coils is shown in FIG. 10. The electric lines of the three coils 101, 102, 103 are wound next to one another in a common winding plane to form a common winding. First terminals 101a, 102a, 103a of the coils lead from the outer region of the winding into the interior of the winding. In the further course of the winding the electric lines of coils 101, 102, 103 lead in spiral form and parallel to one another to the outside where the second terminals 101b, 102b, 103b are located.

In a feasible variant (not shown) the first terminals 101a, 102a, 103a are omitted and a second winding is provided above the plane of the Figure or below the plane of FIG. 10, The electric lines forming the two windings are connected with one another in the interior of the windings such that the first coil, the second coil and the third coil are each formed by the two windings. As is also the case in the embodiment example of FIG. 10, the three coils are electrically isolated from one another.

It is claimed:

1. A charging circuit for an energy store of a portable electrical device, comprising:
a first resonance switching circuit having
a first receiver coil for receiving an alternating magnetic field that induces in the first receiver coil an electric voltage, and
at least one further electrical component connected to at least one terminal of the first receiver coil,
wherein the first receiver coil and the at least one further electrical component with their impedances determine a resonance frequency (f0) of the first resonance switching circuit,
characterized by
at least one second resonance circuitry with
a second receiver coil for receiving an alternating magnetic field that induces in the second receiver coil an electric voltage, and
at least one further electrical component that is connected to at least one terminal of the second receiver coil,
wherein the second receiver coil and the at least one further electrical component with their impedances determine a resonance frequency (f1, fn) of the second resonance circuitry,
wherein the resonance frequency of the second resonance circuitry is an integer multiple of the resonance frequency of the first resonance switching circuit, and
wherein the receiver coils of the resonance circuitry are disposed such that during operation of the charging circuit they are permeated by the same magnetic field lines of the alternating magnetic field.

2. A charging circuit as in claim 1, wherein at least two of the receiver coils comprise at least one winding of an electric line, wherein the electric lines of the at least two receiver coils extend parallel to one another and are supported by a common carrier.

3. A charging circuit as in claim 2, wherein at least two of the receiver coils comprise each at least one winding of an electric line, wherein the electric line of at least one of the receiver coils over the entire course of the windings of their winding extends parallel to the electric line of the other receiver coil or at least of one of the other receiver coils.

4. A charging circuit as in claim 2, wherein the electric lines of at least two of the receiver coils form a common spiral-shaped winding, wherein the electric lines extend next to one another in one winding plane of the spiral-shaped winding.

5. A charging circuit as in claim 4, wherein the electric lines form two spiral-shaped windings and wherein the sections of the electric lines disposed in the interior of the two spiral-shaped windings are connected with one another such that a series circuit of the two spiral-shaped windings at the outside of the viral-shaped windings are electrically connected to further elements of the particular resonance switching circuits.

6. A portable electrical device comprising:
the charging circuit according to claim 1; and
an energy store,
wherein the energy store is electrically connected to the charging circuit, such that during reception of an alternating magnetic field through the receiver coils the electric voltage induced in the receiver coils generates a charging current that charges the energy store.

7. A configuration for charging an energy store of a portable electrical device, comprising:
the charging circuit of claim 1; and
a portable electrical device comprising said charging circuit and an energy store, wherein the energy store is electrically connected to the charging circuit, such that during reception of an alternating magnetic field through the receiver coils the electric voltage induced in the receiver coils generates a charging current that charges the energy store; and
a generation circuit for generating the alternating magnetic field.

8. A method for charging an energy store of a portable electrical device comprising the steps of:
receiving an alternating magnetic field and inducing an electric voltage through a first receiver coil, Wherein a resonance frequency (f0) during the induction of the electric voltage is determined through the impedances of the first receiver coil and at least of one further electrical component (63, 64), which together form a first resonance switching circuit,
characterized by
receiving the same alternating magnetic field and inducing of an electric voltage through a second receiver coil, wherein a resonance frequency (f1, fn) is determined during the induction of the electric voltage through the impedances of the second receiver coil and at least of a further electrical component, which together form a second resonance circuitry,
wherein the resonance frequency of the second resonance circuitry is determined to an integer multiple of the resonance frequency of the first resonance switching circuit, and
wherein the receiver coils of the resonance circuitry are disposed such that during operation of the charging circuit they are permeated by the same magnetic field lines of the alternating magnetic field.

9. A method as in claim 8, wherein, driven by the induced electric voltages of the first and of the second receiver coils, electric currents are each supplied across a rectifier connected to the first or the second resonance circuitry, are supplied to the energy store, wherein the rectifiers are connected in series and/or parallel to one another.

10. A method for the production of a charging circuit for an energy store of a portable electrical device, comprising the steps of:
forming a first resonance switching circuit, with a first receiver coil for receiving an alternating magnetic field which induces an electric voltage in the first receiver coil, and with at least one further electrical component which is connected to at least one terminal of the first receiver coil, wherein by determining the impedances of the first receiver coil and of the at least one further electrical component a resonance frequency (f0) of the first resonance switching circuit is determined,
forming a second resonance circuitry with a second receiver coil for receiving an alternating magnetic field which induces an electric voltage in the second receiver coil, and with at least one further electrical component which is connected to at least one terminal of the second receiver coil and wherein by determining the impedances of the second receiver coil and of the at least one further electrical component a resonance frequency (f1, fn) of the second resonance circuitry is determined,
wherein the resonance frequency of the second resonance circuitry is determined to an integer multiple of the resonance frequency of the first resonance switching circuit, and wherein the receiver coils of the resonance circuitry are disposed such that during operation of the charging circuit these are permeated by the same magnetic field lines of the alternating magnetic field.

11. A charging circuit as in claim 3, wherein the electric lines of at least two of the receiver coils form a common spiral-shaped winding, wherein the electric lines extend next to one another in one winding plane of the spiral-shaped winding.

\* \* \* \* \*